(12) United States Patent
Waheed

(10) Patent No.: US 12,197,626 B2
(45) Date of Patent: Jan. 14, 2025

(54) COMMUNICATION NODE WITH SECURE CRYPTOGRAPHIC KEYS AND METHODS FOR SECURING THEREIN

(71) Applicant: NXP B.V., Eindhoven (NL)

(72) Inventor: Khurram Waheed, Austin, TX (US)

(73) Assignee: NXP B.V., Eindhoven (NL)

( * ) Notice: Subject to any disclaimer, the term of this patent is extended or adjusted under 35 U.S.C. 154(b) by 287 days.

(21) Appl. No.: 17/644,195

(22) Filed: Dec. 14, 2021

(65) Prior Publication Data

US 2023/0185970 A1 Jun. 15, 2023

(51) Int. Cl.
- G06F 21/72 (2013.01)
- G06F 21/60 (2013.01)
- G06F 21/62 (2013.01)

(52) U.S. Cl.
CPC ........... G06F 21/72 (2013.01); G06F 21/602 (2013.01); G06F 21/6218 (2013.01)

(58) Field of Classification Search
CPC ..... G06F 21/72; G06F 21/602; G06F 21/6218
See application file for complete search history.

(56) References Cited

U.S. PATENT DOCUMENTS

| | | | |
|---|---|---|---|
| 7,440,465 B2 | 10/2008 | Park | |
| 7,975,140 B2 | 7/2011 | Fedyk et al. | |
| 8,185,947 B2 | 5/2012 | Kurapati et al. | |
| 8,566,952 B1 * | 10/2013 | Michaels | G06F 21/6218 726/30 |
| 8,774,411 B2 | 7/2014 | Cakulev et al. | |
| 9,369,441 B2 * | 6/2016 | Lal | H04L 63/062 |
| 9,419,794 B2 | 8/2016 | Polzin et al. | |
| 9,742,560 B2 | 8/2017 | Simon et al. | |
| 10,742,412 B2 * | 8/2020 | Windle | H04L 9/088 |
| 11,240,007 B1 * | 2/2022 | Higgins | H04L 9/3268 |
| 2010/0254537 A1 * | 10/2010 | Buer | G06F 21/602 380/279 |
| 2017/0163607 A1 * | 6/2017 | Skuratovich | H04L 65/1046 |
| 2017/0220812 A1 * | 8/2017 | Lopez | G06F 21/602 |
| 2018/0075259 A1 * | 3/2018 | Manapragada | G06F 21/85 |
| 2020/0366653 A1 * | 11/2020 | Caceres | H04L 63/0853 |
| 2021/0377020 A1 * | 12/2021 | Kashid | H04L 9/083 |
| 2022/0067221 A1 * | 3/2022 | Schiattarella | G06F 21/602 |
| 2023/0259462 A1 * | 8/2023 | Zhang | G06F 21/602 713/193 |

* cited by examiner

Primary Examiner — Jung W Kim
Assistant Examiner — Alan L Kong

(57) ABSTRACT

Securing protocol keys in a communication node comprises transferring a protocol access key stored in a secure enclave of a secure host platform to a secure key store in a communication platform via a secure transfer. The protocol access key which is plaintext is secure from access by a host processor of the secure host platform. A protocol key stored in the secure enclave is encrypted to an encrypted protocol key. The encrypted protocol key is transferred from the secure enclave to the communication platform over an unsecure bus. The encrypted protocol key is deciphered based on the protocol access key in the communication platform to form the protocol key. The protocol key which is plaintext is secured from access by the host processor, the communication controller, or both.

22 Claims, 8 Drawing Sheets

| Protocol Key Type | Source | Components | Transfer Mechanism | Accessible to Host | Accessible to Comm Cntlr | Protocol Key Decipher | Accessible to Host | Accessible to Comm Cntlr |
|---|---|---|---|---|---|---|---|---|
| Secured Connectivity Protocol Keys (SCPKs), e.g., ESK or Secured IEEE 802.15.4 keys | Host Processor | Encrypted Protocol Key | Unsecure Data Bus, e.g., AHB, IPS | Y | Y | On the fly | N | N |
| | | | Unsecured IPC Bus, e.g., UART, USB, etc. | Y | Y | | | |
| | | | Delivered to Shared Memory | Y | N | | | |
| | Security Enclave | Protocol Access Key | Secure or Private Bus | N | Y/N | | | Y/N |
| | | | Secure or Private encryption over an unsecured IPC | N | Y | | | |
| Encrypted Connectivity Protocol Keys (ECPKs), e.g., EIRK | Host Processor | Encrypted Protocol Key | Unsecure Data Bus, e.g., AHB, IPS | Y | Y | Via Comm Cntlr | N | Y |
| | | | Unsecured IPC bus, e.g., UART, USB, etc. | Y | N | | | |
| | Security Enclave | Protocol Access Key | Secure or Private Bus | N | Y/N | | | |
| | | | Secure or Private encryption over an unsecured IPC | | | | | |

ESK = Encrypted Session Key
EIRK = Encrypted Identity Resolution Key

Y = Yes
N = No
Y/N = Yes or No depending on arrangement

FIG. 6

COMMUNICATION NODE WITH SECURE CRYPTOGRAPHIC KEYS AND METHODS FOR SECURING THEREIN

FIELD OF USE

This disclosure generally relates to a communication node, and more particularly to securing cryptographic keys in the communication node.

BACKGROUND

A communication node such as an edge node is device that provides an interface for communicating with other nodes over a communication network using a wired channel such as Ethernet, a wireless channel such as WiFi, or a combination with the Internet. A typical edge node incorporates a processor to generate data locally by processing on the edge node and some form of connectivity such as a wired or wireless interface to receive data from a node of the other nodes. The data generated locally or received is then relayed over the communication network to one or more nodes of the other nodes.

A number of edge nodes deployed in the communication network is increasing with the advent of internet of things (IoT) devices in the form of the edge nodes. The increase in the number of the edge nodes increases a need for security of the edge nodes. Each edge node is an opening for stealing node or network credentials or insertion of malware which could be transferred to the other nodes. To reduce chances of such theft or introduction of malware, the processor in the edge node could have secure elements such as secure boot, code authentication, a trusted execution environment, secure storage, etc.

BRIEF DESCRIPTION OF THE DRAWINGS

FIG. 6 is an example table which summarizes operation of the communication node for different types of cryptographic keys in accordance with an embodiment.

Figure 1:
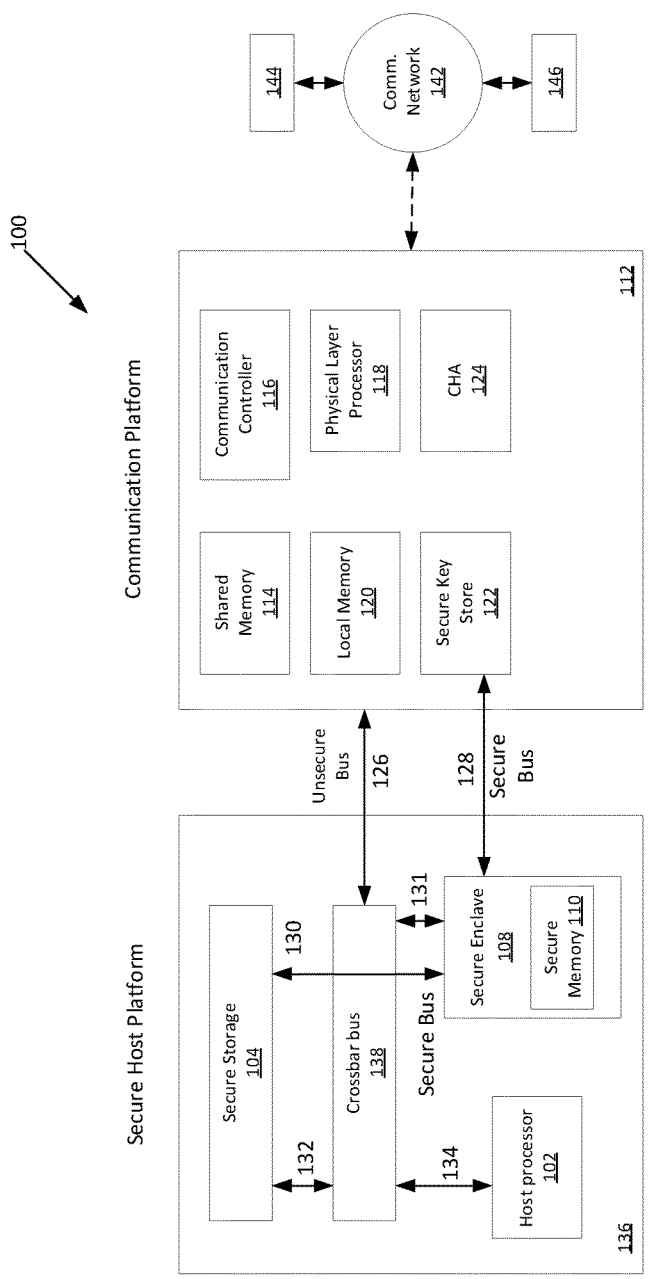
FIG. 1 is a block diagram of an example communication node such as an edge node for communicating data in accordance with an embodiment.

The drawings are for the purpose of illustrating example embodiments, but it is understood that the embodiments are not limited to the arrangements and instrumentality shown in the drawings.

DETAILED DESCRIPTION

Wired and wireless connectivity standards such as Bluetooth (BT), Bluetooth low energy (BLE), Zigbee (IEEE 802.15.4), WiFi (IEEE 802.11), Secure Controller Area Network (CAN). Universal Serial Bus (USB), Ethernet (IEEE 802.3) etc. define various cryptographic protocol keys and cryptographic techniques to provide security in transmitting data from a node and receiving data by a node. The standards also define methods to securely exchange the cryptographic protocol keys between different nodes in a communication network using a cryptographic technique, but security of the cryptographic protocol keys within a node is not as well defined and is left as a proprietary implementation. The node typically comprises a host processor in a host platform coupled to a communication platform which operate to perform wired or wireless communication. The communication platform receives cryptographic protocol keys encrypted based on a cryptographic technique which are decrypted based on a cryptographic technique. Additionally, the host processor generates cryptographic protocol keys which are stored in a memory of the communication platform. In a legacy mode, the cryptographic protocol keys in plaintext are accessible to the host processor providing a risk that malware introduced into a node and specifically to the host processor could comprise the cryptographic protocol keys, the node, and other nodes on the communication network.

Embodiments disclosed herein are directed to a communication node such as an edge node having a secure host platform and a communication platform. The secure host platform includes a host processor and a secure enclave. The host processor performs operations above a link layer of an open systems interconnect (OSI) model and the secure enclave secures the cryptographic keys such as protocol keys and protocol access keys in a secure storage. The communication platform has a communication controller and physical layer processor to perform data link layer processing and physical layer processing, respectively, of the OSI model associated with wired or wireless communication based on the protocol keys.

The secure enclave defines a root of trust that secures and protects the cryptographic keys from the host processor and the communication controller. Security of the cryptographic keys or securing the cryptographic keys means that the host processor is not able to access the cryptographic keys in plaintext. To maintain security, the protocol keys stored in the secure enclave are secured based on a cryptographic technique such as encryption before being sent to the communication platform. In an example, encrypted protocol keys are stored in a memory shared with the host processor and secured from the host processor by the encryption. The secure enclave may also contain support for encryption/decryption acceleration using a cryptographic hardware accelerator (CHA) of the communication platform. The CHA may implement one or more encryption/decryption, ciphering or authentication algorithms, including but not limited to Advanced Encryption Standard (AES), Elliptic-curve cryptography (ECC), Secure Hash Algorithm (SHA), etc. in an example, the secure enclave causes a protocol access key to be provided to a secure key store of the communication platform. A decipher block or the CHA of the communication platform uses the protocol access key and a cryptographic technique to decipher (e.g., decrypt) the encrypted protocol keys to plaintext. Depending on a type of the protocol keys, the protocol keys in plaintext are stored in a local memory of the communication platform or dynamically used by the CHA without being stored on the communication platform. The protocol keys in plaintext are protected from access by the host processor or nodes external to the communication node. Well known instructions, protocols, structures, and techniques have not been shown in detail in order not to obfuscate the description.

Example Systems

FIG. 1 is a block diagram of an example communication node 100 for communicating data in accordance with an embodiment. The communication node 100 may communicate messages with a communication network 142 with one or more other communication nodes shown in this example as nodes 144, 146 via one or more of a wired link and a wireless link. In an example, the communication node 100 may be an edge node of the communication network 142. The communication node 100 includes a secure host platform 136 having a host processor 102, a secure enclave 108, and a secure storage 104. The communication node 100 also has a communication platform 112 having a communication controller 116, secure key store 122, a local memory 120, a shared memory 114, a cryptographic hardware accelerator (CHA) 124, and a physical layer processor 118. A bus (e.g., data bus) such as crossbar bus 138 facilitates data communication between components of the secure host platform 136 and the communication platform 112. The crossbar bus 138 may be a parallel bus in this example. In an example, the host processor 102, the secure enclave 108, and secure storage 144 may be coupled to the crossbar bus 138 via link 134, 131, and link 132 respectively. In an example, link 126 may facilitate communication between the components of the secure host platform 136 and the communication platform 112 using an unsecured bus which may be an Advanced High-performance Bus (AHB), Advanced Peripheral Bus (IPB), intra-peripheral serial interface (IPS), Synchronous Serial Interface (SSI) or a serial bus such as an unsecure inter-processor communication (IPC) bus (USB, SPI, QSPI, UART, etc.) or similar. The host processor 102, secure enclave 108, secure storage 104, communication controller 116, secure key store 122, local memory 120, CHA 124, shared memory 114, and physical layer processor 118, crossbar bus 138, and other components shown or not shown may be each implemented using circuitry such as analog circuitry, mix signal circuitry, memory circuitry, logic circuitry, processing circuitry arranged to execute code stored in a memory and when executed by the processing circuitry perform the disclosed functions, or combinations thereof.

In an example, the secure host platform 136 and the communication platform 112 may be implemented as a system on a chip (SOC) and collectively implement a communication protocol such as Bluetooth (BT), Bluetooth low energy (BLE), WiFi (IEEE 802.11), Zigbee (IEEE 802.15.4), Secure-CAN, Universal Serial Bus (USB) or Ethernet (IEEE 802.3). The host processor 102 of the secure host platform 136 may be arranged to perform operations associated with upper layer protocols of a communication protocol such as an application layer, presentation layer, session layer, transport layer, and media access control (MAC) layer of an open systems interconnect (OSI) model and coordinate operations among components of the secure host platform 136. The communication controller 116 of the communication platform 112 may be arranged to perform operations associated with the data link layer of the OSI model and coordinate operations among components of the communication platform 112. The physical layer processor 118 of the communication platform 112 may be arranged to perform operations associated with the physical layer of the OSI model.

In examples, a communication protocol may use cryptographic keys such as protocol keys to securely communicate the data transmitted or received over the communication network 142. The protocol keys are strings of data that are used to encrypt or decrypt certain data to be transmitted or received over the communication network 142 based on cryptographic techniques. Examples of cryptographic techniques include hash functions, symmetric-key algorithms, and asymmetric-key algorithms.

The communication node 100 may be arranged to provide key generation, key extraction from messages received over the communication network 142, and secure key management of protocol keys associated with the communication protocol. The protocol keys are typically integers. Examples of key generation include random number generation using a random number generator (RNG) or pseudorandom number generator (PRNG). Key extraction is a process of recovering a protocol key transmitted in a message received over the communication network 142 such as during an association between nodes. Secure key management means the host processor 102 may not able to access cryptographic keys in plaintext such as protocol keys, for example, stored in one or more of the secure enclave 108, secure storage 108, secure key store 122, or CHA 124 and as exchanged therebetween. The secure key management prevents malware running on the host processor 102 from accessing the keys and comprising security of communication by the communication node 100.

In an example, the host processor 102 may signal the secure enclave 108 to generate protocol keys or extract from a message received over the communication network 142 from another node protocol keys which are encrypted in the message. In an example, the secure enclave 108 may also secure the protocol keys from access by the host processor 102 in plaintext. Plaintext is a form of the protocol keys which can be seen or utilized by the host processor 102 without the need for a protocol access key or deciphering process. The protocol keys generated, extracted from a received message, or stored may take many forms depending on the communication protocol. In the BT protocol, the protocol keys may include one or more of a long term key (LTK), session key (SK) a local identity resolving key (IRK), a peer IRK, and a connection signature resolving key (CSRK). The LTK is a persistent key in the communication node 100. In one example, an encrypted LTK may be extracted from a received message from another node 144, 146 and decrypted by the secure enclave 108 based on a cryptographic technique. In another example, the LTK may be a random value generated by the secure enclave 108. The LTK may be used to generate a session key (SK) to encrypt a connection between the communication node 100 and another node based on a cryptographic technique. The local IRK and peer IRK are protocol keys used to resolve a private address that authenticates communication with a node. The CSRK is a protocol key used to generate a message authentication code (MAC) as a result of applying the CSRK to a message to be transmitted based on a cryptographic technique. The MAC is a short piece of information used to authenticate a message, e.g., to confirm that the message came from the stated sender (its authenticity) and has not been changed. The MAC value protects a message's data integrity, as well as its authenticity, by allowing verifiers (who also possess the CSRK) to detect any changes to the message content. The MAC may be placed before or after the message to be transmitted by the communication node 100.

The protocol keys may be stored in a secure memory 110 of the secure enclave 108. The secure memory 110 is secure because the secure enclave 108 may not allow the host processor 102 or controller 116 access to the stored protocol keys such as LTK, SK, IRK, and CRSK which are in plaintext. The secure storage 104 may also store in encrypted form the protocol keys such as an encrypted LTK (ELTK), encrypted SK (ESK), encrypted IRK (EIRK), and encrypted CSRK (ECSRK) for each node in communication with the communication node 100. The encrypted protocol keys are encrypted based on a cryptographic technique to secure the encrypted protocol keys from access by the host processor 102. To facilitate secure communication of the protocol keys between the secure memory 110 and the secure storage 104, the secure enclave 108 may transfer the encrypted protocol keys over a secure bus 130 which securely communicates the encrypted protocol keys. The secure bus 130 may use a proprietary or secure protocol such as encryption or obfuscation (e.g., masking) to securely transfer the encrypted protocol keys.

The host processor 102 may receive one or more of the ESK and EIRK from the secure enclave 108 and send one or more of the ESK and EIRK to the communication platform 112 for use in communication with another communication node. Alternatively, the host processor 102 or communication controller 116 via an application programming interface (API) associated with firmware in the secure enclave 108 may cause the secure enclave 108 to send one or more of the ESK and EIRK to the communication platform 112 for use in communication with another communication node. The ESK or EISK may be stored further in a shared memory 114 accessible to the controller 116 and the host processor 102. The ESK and IRK may be secure from access by the host processor 102 because of the encryption. Further, the communication platform 112 may decipher (e.g., decrypt) the ESK and EIRK based on a cryptographic key in the form of a protocol access key which the secure enclave 108 provides to the secure key store 122 over a secure bus 128 which securely transfers the protocol access key. The secure bus 128 may use a proprietary or secure protocol such as encryption or obfuscation (e.g., masking) to securely transfer the protocol access key. The secure key store 122 secures the protocol access key on the communication platform 112 from the host processor 102 so that the host processor 102 and the communication controller 116 does not have access to the protocol access key in plaintext. In an example, the communication controller 116 may use an API to cause the secure enclave 108 to provide the protocol access key to the secure key store 122. The communication platform 112 may be arranged with a cryptographic technique such as advanced encryption standard (AES) to decipher the EIRK or ESK based on the protocol access key. In an example, the CHA 124 may decipher the EIRK based on the protocol access key and in an example, a decipher block (not shown) may decipher the ESK based on the protocol access key and provide the SK to the CHA 124. The IRK may be stored in the local memory 120 of the communication platform 112 and not be accessible to the host processor 102 but accessible to the communication controller 116 in an example. The SK may be dynamically provided to the CHA 124 based on the deciphering but not stored in the communication platform 112 after deciphering such as in a register or memory (either persistently or non-transitorily) so that it is not accessible to the host processor 102 or the communication controller 118 in an example.

The CHA 124 may perform additional functions based on the protocol keys. In an example, an encryption/decryption engine of the CHA 124 uses the protocol keys to encrypt messages for transmission over the communication network and decrypt or authenticate messages received over the communication network. The encrypted messages may be provided to the physical layer processor 118 and the decrypted messages may be provided to the communication controller 116 which includes the data link layer processing. The physical layer processor 118 may perform functions associated with the physical layer of the OSI model. The functions may include transmitting or receiving bits over a physical link which is a wired or wireless communication path including transmitting the encrypted message to the communication network 142. The communication controller 116 may perform functions associated with the data link layer of the OSI model. The functions may include point-to-point communication between communication nodes.

In examples, the secure enclave 108 and the communication platform 112 implement different levels of security depending on a type of the protocol keys within the communication node 100. The security prevents the host processor 102 from accessing the protocol keys in plain text which would otherwise result in malicious code running on the host processor 102 comprising security of the communication node 100. A security level may specify one or more of whether the protocol key is stored only in the secure enclave 108 in plaintext, provided to the shared memory 114 in an encrypted form, deciphered with a protocol access key, stored in the local memory 122 in plaintext, or not stored on the communication platform 112. The LTK, SK, IRK, CSRK are example protocol keys used in the communication node 100 with different security levels.

The protocol keys may take other forms with a respective security level. The different types of protocol keys and related security level may be generally categorized in three levels in an example.

In a first security level, secured connectivity protocol assets (SCPAs) may be protocol keys such as the LTK stored in the secure enclave 108. In an example, the SCPAs are protocol keys received from another communication node 144, 146 in encrypted form and decrypted within the secure enclave 108 based on a cryptographic technique and maintained within the secure enclave 108 as an asset in the secure memory 110. The SCPAs is not directly accessible to the host processor 102 or the controller 116 of the communication platform 112. Instead, the secure enclave 108 provides an API to allow for processing based on the protocol keys in the secure enclave 108. The host processor 102 may use the API to perform functions based on the protocol keys while the protocol key remains secure in the secure enclave 108.

In a second security level, secured connectivity protocol keys (SCPKs) may be protocol keys such as the ESK or secure IEEE 802.15.4 keys accessible to the host processor 102, but the SK or IEEE 802.15.4 keys in plaintext is not accessible to the host processor 102 or communication controller 116. The SCPKs may be protocol keys to perform encryption and decryption of a communication session between communication nodes. The SCPKs may be received from another communication node or generated by the secure enclave using the SCPAs. The secure enclave 108 or host processor 102 may deliver SCPKs to the communication platform 112 for storage in the shared memory 114 which is shared between the host processor 102 and the controller 116. The host processor 102 may have access to the SCPKs stored in the shared memory 114 but the SCPKs in plaintext remain secured from the host processor 102 and the communication controller 116. Further, the secure enclave 108 may deliver a protocol access key to the secure key store 122 using a secure mechanism such as the secure bus 128. The communication controller 116 may cause the SCPKs to be deciphered by the protocol access key to plaintext and dynamically used by the CHA 124 in plaintext but not stored in the communication platform 112 such as in a memory or register (either persistently or non-transitorily) and not accessible to the host processor 102 or communication controller 116. In an example, the communication controller 116 may also use an API to request the secure enclave 108 to deliver the protocol access keys. In an example, the communication controller 116 may also use an API to request the secure enclave 108 to refresh the protocol access keys. The protocol access keys may be ephemeral (e.g., valid to decrypt a protocol key for only a predefined time). A refresh operation may be initiated by the communication controller 116 or application code executing on the host processor based on time (e.g., time expiry) or a function of communication activity which causes a message to be sent to the secure enclave 108 to request a refresh.

In a third security level, encrypted connectivity protocol keys (ECPKs) may be protocol keys such as EIRK stored in the local memory 120 in an unencrypted form and not accessible to the host processor 102. In an example, the ECPKs may be protocol keys transmitted or received with other communication nodes 144, 146 but because of the encryption the protocol keys are secure from access by the host processor 102 and the communication controller 116 to prevent malicious code on the host processor 102 or the communication controller 116 from accessing the protocol keys. The secure enclave 108 or host processor 102 may deliver the ECPKs to the communication platform 112 such as to the shared memory 114 or communication controller 116 and the secure enclave 108 may deliver a protocol access key to the secure key store 122 using a secure mechanism such as a secure bus 128. Further, the CHA 124 may decrypt the ECPKs based on a cryptographic technique and the protocol access key provided by the secure enclave 108. The decrypted ECPKs may be stored in the local memory 120 which is accessible to the communication controller 116 but not accessible to the host processor 102.

Figure 2:
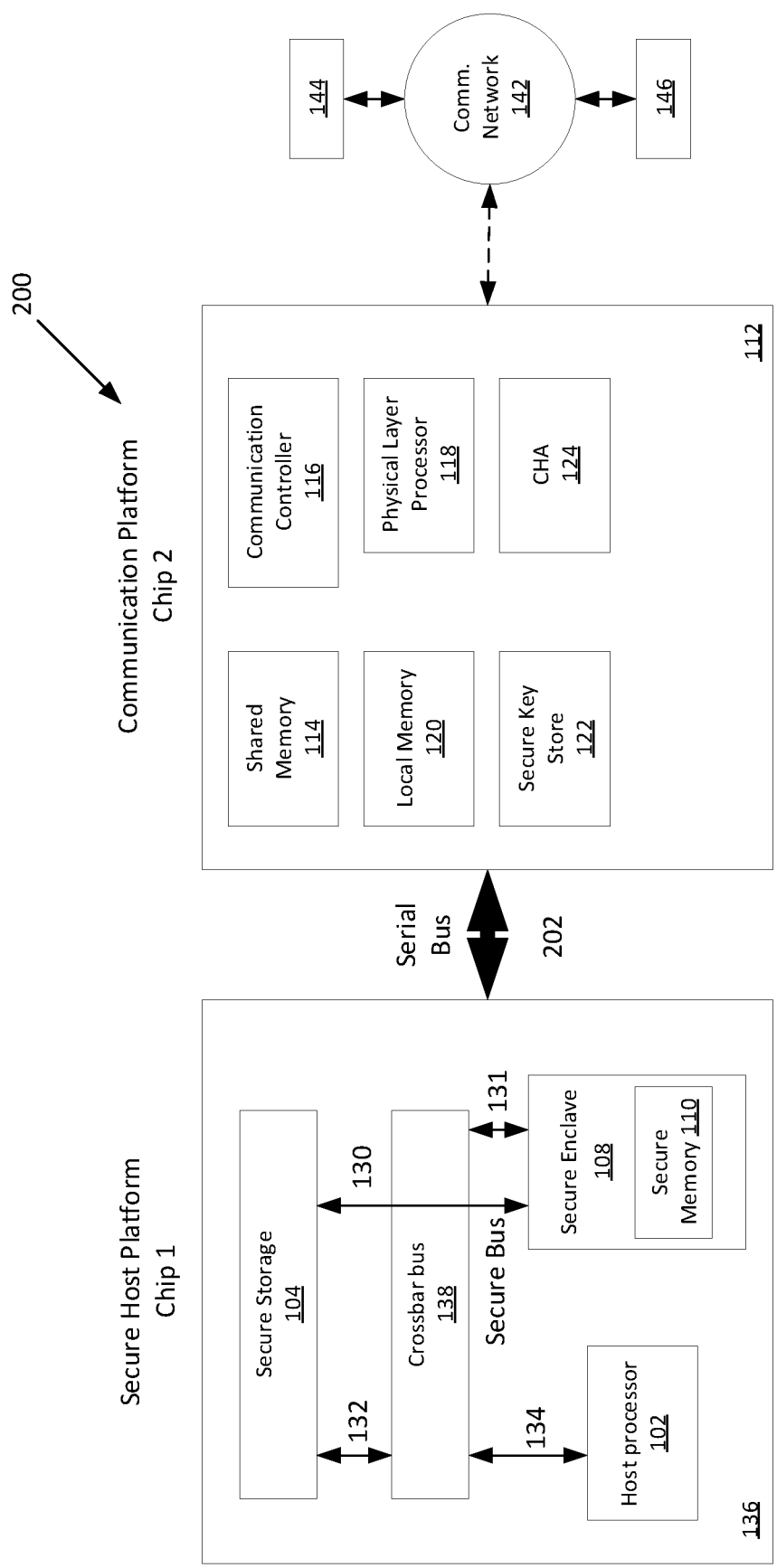
FIG. 2 is an alternative block diagram of the example communication node for communicating data in accordance with an embodiment.

FIG. 2 is a block diagram of an alternative example communication node 200 for communicating data in accordance with an embodiment. Instead of the secure host platform 136 and the communication platform 112 being on a system on a chip (SOC), the secure host platform 136 and the communication platform 112 may be arranged on separate semiconductor chips shown as chip 1 and chip 2. A serial bus 202 such as an unsecure inter processor communication bus which operates based on a universal serial bus (USB) protocol, a controller area network (CAN) protocol, or Universal Asynchronous Receiver/Transmitter (UART) in examples may facilitate communication between the secure host platform 136 and the communication platform 112 including communication of the protocol keys, protocol access keys, and data associated with transmission and reception over the communication network 142. In one example, the protocol access keys may be securely communicated over the bus 202 by secure or private encryption using cryptographic techniques to the secure key store 102. For instance, cryptographic keys may be used to secure the protocol access keys for transmission and recovery of the protocol access keys. As another instance, an obfuscation process may be used to mask the protocol access keys for transmission and later recover the protocol access keys. The host processor 102 and the communication controller 116 may not have access to the protocol access keys in plaintext. The secure enclave 108 and the secure key store 122 may be aware of the encryption or obfuscation process such that the secure key store 122 is able to recover the protocol access keys. In another example, protocol access keys may be securely communicated over the bus 202 by secure or private encryption using cryptographic techniques to the communication controller 116 which then provides the protocol access keys to the secure key store 122. The secure enclave 108 and the communication controller 116 may be aware of the encryption or obfuscation process and manner of recovery. In this example, the host processor 102 may not have access to the protocol access keys in plaintext, but the communication controller 116 may have access to the protocol access keys in plaintext. In an example, the communication controller 116 may still not be able to decipher the protocol keys even having the protocol access keys in plaintext because additional processing only known by the CHA 124 or decipher block may be needed to perform the further deciphering.

Figure 3:
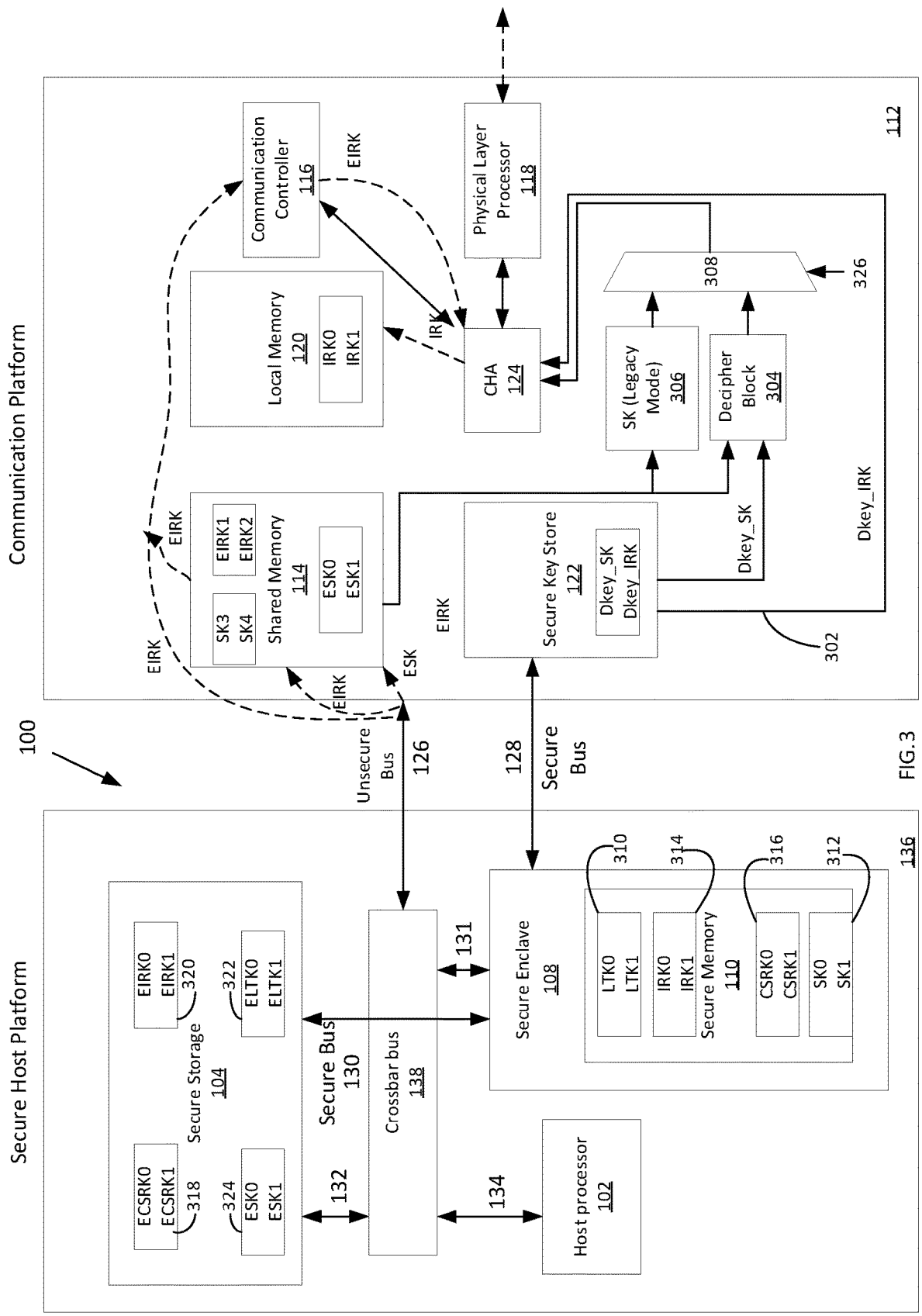
FIG. 3 is a detailed block diagram of the example communication node for communicating data in accordance with an embodiment.

FIG. 3 is a detailed block diagram of the example communication node 100 for communicating data in the communication network 142 in accordance with an embodiment. The communication node 100 includes the secure host platform 136 having the host processor 102, the secure enclave 108, the crossbar bus 138, and the secure storage 104. The communication node 100 also has the communication platform 112 having the communication controller 116, the secure key store 122, the local memory 120, the cryptographic hardware accelerator (CHA) 124, the secure key store 122, and the physical layer processor 118. Functions of these components have been already described above and are not repeated here again for conciseness.

In examples, the communication node 100 may use protocol keys to securely communicate the data transmitted or received over the communication network 142. The protocol keys may be obtained and stored in many ways to remain secure from the host processor 102.

In an example, the host processor 102 may signal the secure enclave 108 to generate or extract from a message one or more communication protocol keys associated with communication by the communication node with another communication node also referred to here as a peer device. For example, the host processor 102 may signal the secure enclave 108 by an API to generate or extract from a message received from the peer device one or more of the LTK, SK, IRK, and CSRK associated with the peer device. Based on the signal, the secure enclave 108 may generate the LTK associated with the communication with the peer device or extract the LTK in a message received from the peer device during an association between the communication node 100 and the peer device. The LTK may be stored in a memory bank 310 of the secure memory 110 in the secure enclave and is not accessible to the host processor 102 in plaintext. The LTK is used to generate the SK for an encrypted session between the communication node 100 and the peer device. The SK may be a temporary key used for the session. The SK may be stored in a memory bank 312 of the secure memory 110 of the secure enclave and is not accessible to the host processor 102 in plaintext. In an example, the IRK may be a 128 bit randomly generated key. The IRK may be a local IRK generated by the secure enclave 108 and used to generate a private addresses for the communication node 100. The IRK may also be a peer IRK. The host processor 102 may provide a message from the peer device with the peer IRK which is encrypted and request that the secure enclave 108 decrypt the peer IRK. The local IRK and peer IRK may be stored in a memory bank 314 of the secure memory 114 of the secure enclave 108 and are not accessible to the host processor 102 in plaintext. Further, the secure enclave 108 may generate a CSRK associated with the communication node 100. The CSRK may be stored in plaintext in a memory bank 316 of the secure memory 110 which is not accessible to the host processor 102.

The secure enclave 108 may generate or receive protocol keys associated with communication with a plurality of peer devices. Each peer device may be associated with one or more respective protocol keys. For example, LTK0, SK0, IRK0, and CSRK0 may be associated with peer device 0. Similarly, LTK1, SK1, IRK1, and CSRK1 may be associated with peer device 1. The secure enclave 108 may store those protocol keys associated with an active communication session with a peer device in the secure memory 110. In an examples, the secure enclave 108 may also store one or more of the protocol keys in a secure storage 104 such as a non-volatile memory. For example, the secure storage 104 may store protocol keys associated with peer devices not in an active communication session with the communication node 100. The secure enclave 108 may encrypt the protocol keys based on an encryption key and a cryptographic technique and store the encrypted protocol key in the secure store 104 by transfer over the secure bus 130 between the secure enclave 108 and the secure store 104. The secure store 104 may store one or more of the encrypted CSRK (ECSRK), encrypted IRK (EIRK), encrypted LTK (ELTK), and encrypted SK (ESK) in respective memory banks 318-324.

In an example, the communication platform 112 may store a resolving list in the local memory 120 of the communication platform 112. The resolving list may comprise a list of peer IRKs associated with different peer devices in communication with the communication node 100 which the communication node 100 may use to identify messages from each peer device. The host processor 102 may add a peer device which is to communicate with the communication node 100 to the resolving list. The communication controller 116 may send a signal to the secure enclave 108 provide an EIRK to the communication platform 112 associated with the peer device to be added. The EIRK may be formed using the IRK and based on a cryptographic technique and a cryptographic key in the form of an encryption key. The secure enclave 108 may provide the EIRK to the host processor 102 which then provides the EIRK to the communication platform 112 via the crossbar bus 138. Alternatively, the secure enclave 108 may provide the EIRK directly to the communication platform 112 via the crossbar bus 138. In one example, the EIRK may be stored in the shared memory 114 and the communication controller 116 may provide the EIRK stored in the shared memory 114 to the CHA 124. In another example, the communication controller 116 may receive the EIRK from the secure host platform 136 and provide the EIRK to the CHA 124, To perform the decryption of EIRK, the secure enclave 108 may provide a protocol access key Dkey_IRK to the secure key store 122 via the secure bus 128. The protocol access key may be stored in a respective register in the secure key store 122 which may be written to or read from. The communication controller 116 may then cause the Dkey_IRK stored in the shared memory to be provided to the CHA 124 via a control bus 302. The CHA 124 may have a decipher block (not shown) which uses the protocol access key Dkey_IRK and a cryptographic technique to decrypt the EIRK by IRK=AES-128 Decrypt(EIRK, Dkey_IRK). The IRK in plaintext may then be stored in the local memory 120 which is not accessible to the host processor 102 but accessible to the communication controller 116. The deciphering of the EIRK introduces minor latency because the decryption is performed at a non-critical time such as an association process. The communication platform 112 may then use the IRK to resolve a private address of a message received from a peer device.

The communication platform 112 may use the SK to establish secure communication with a peer device. To facilitate this communication, the host processor 102 may signal the secure enclave 108 to send the ESK to the communication platform 112 or receive the ESK from the secure enclave 108 and send to the ESK to the communication platform 112. Alternatively, the communication controller 116 may send a signal to the secure enclave 108 to send the ESK to the communication platform 112. The ESK may be formed using the SK and based on a cryptographic technique and a cryptographic key in the form of an encryption key. The host processor 102 may not have access to the ESK because of the encryption. The communication platform 112 may store the ESK in the shared memory 114. To perform the decryption of ESK, the secure enclave 108 may provide the protocol access key Dkey_SK to the communication platform 112 via the secure bus 128. The protocol access key may be stored in a respective register in the secure key store 122 which may be written to or read from to decrypt the ESK to SK in plaintext. The communication controller 116 may then cause the SK to be provided to the CHA 124. The SK may be dynamically provided to the CHA 124 without being stored in any storage such as memory or register of the communication platform 124 persistently or transitorily to secure the SK in plaintext from the host processor 102 and the communication controller 116.

In an example, the process of providing the SK to the CHA 124 may begin with the ESK stored in the shared memory 114 being provided to a decipher block 304. Additionally, the Dkey_SK stored in the secure store 122 may be provided to the decipher block 304. The Dkey_SK in the decipher block 304 may be secure from access by the host processor 102 and communication controller 116. The decipher block 304 which receives the Dkey_SK and the ESK may decypt the ESK based on a cryptographic technique to an SK=AES-128 Decrypt (ESK, NBU_Dkey_SK) which is then dynamically provided to the CHA 124. In an example, the physical layer processor 118 may then provide a message received from a peer device associated with the SK to the CHA 124 which decrypts the message with the SK of the peer device. In an example, the communication controller 116 may then provide a message to a peer device associated with the SK to the CHA 124 which encrypts the message with the SK of the peer device. The SK may be used by the CHA 124 but not stored in any storage such as memory or register of the communication platform 124 (either persistently or non-transitorily), In one example, a selector signal 326 such as an sk_decip_en bit to the selector 308 may be set to cause the SK which was decrypted to be provided to the CHA 124 for use in encryption or decryption of messages transmitted or received with a peer device. The SK is secure from access by the host processor 102 and communication controller 116 during the decryption process and receipt by the CHA 124. The deciphering of the ESK based on a cryptographic technique introduces a minor latency in the secure connection rather than storing the SK without encryption on the communication platform 112.

In some examples, the communication platform 112 may operate in a legacy mode where the SK is not secure from access by the host processor 102. In the legacy mode, the shared memory 114 may store an SK in plaintext and the host processor 102 and communication controller 116 has access to the SK in plaintext. The signal 326 such as the sk_decip_en bit to the selector 308 may cause the SK stored in the shared memory to be provided to the CHA 124 for use in encryption or decryption of the connection based on a cryptographic technique.

In examples, protocol keys or protocol access keys stored in one or more of the secure enclave 108, secure storage 104, secure key store 122, decryption block 304, selector 308, CHA 124, and transfer therebetween may be secure from access by the host processor 102.

In an example, secure enclave 108 may perform functions including load and refresh of the protocol access keys stored in the secure key store 122. The protocol access keys may be ephemeral and loaded or refreshed during a power up or periodic time interval (e.g., at time expiry). The secure enclave 108 may also cause the protocol access keys stored in the secure key store 122 to be deleted such as when security of the protocol access keys are compromised. The communication controller 116 may cause the secure enclave 108 to perform these functions in some examples via an API associated with the secure enclave 108.

In an example, the crossbar bus 138 or unsecure bus 126 may be arranged to block any access by the host processor 102 to the IRK stored in the local memory 120 so that malware on the host processor 102 may not access the IRK in an unencrypted form. For example, the local memory 120 may be addressable memory and the crossbar bus 138 or unsecure bus 126 may prevent any memory access to the addressable memory of the local memory 120.

In some examples, the communication node 100 may be arranged in a non-secure mode where the secure enclave 108 provides SK or IRK rather than ESK or EIRK to the communication platform 112 and a secure mode where the ESK and protocol access key and EIRK and protocol access key is provided as described above. The signal provided to the secure enclave 108 to provide the protocol keys may indicate by a "secure mode" variable whether the protocol keys should be encrypted or not before being provided to the communication platform 112. In an example, if the secure mode=1, then the protocol keys should be encrypted and if the secure mode=0, then the protocol keys should not be encrypted and the communication node 100 may manage the protocol keys in accordance with the legacy mode.

In an example, one or more protocol keys may be based on a random number. The communication platform 112 may implement a pseudorandom number generator (PRNG) to generate the random number. The PRNG may be seeded by a true random number generator (TRNG) value that is either acquired from the secure enclave 108 and provided by the secure enclave 108 based on an API message or generated locally in the communication platform 112.

Figure 4:
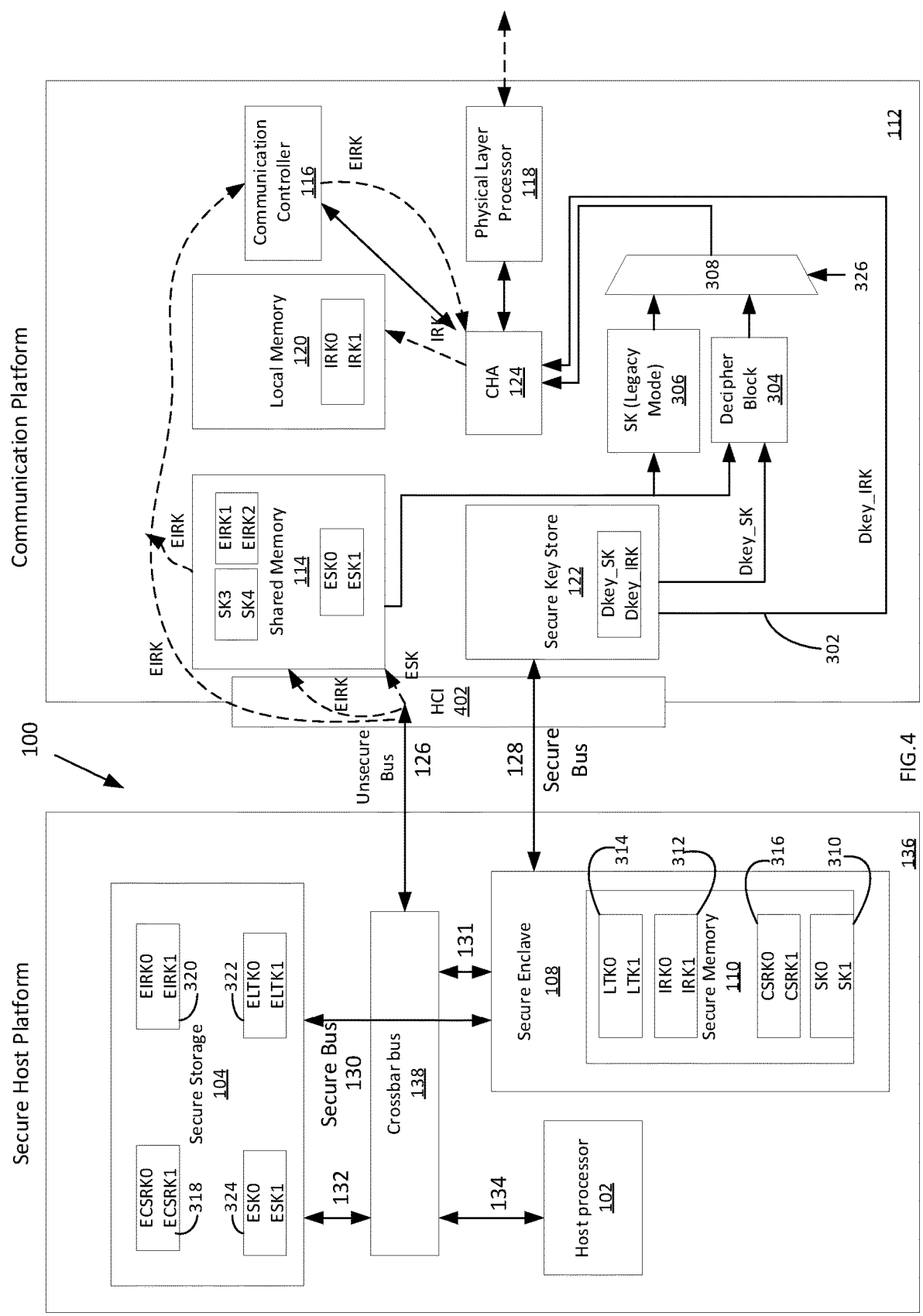
FIG. 4 is an alternative detailed block diagram of the example communication node for communicating data in the communication network in accordance with an embodiment.

FIG. 4 is an alternative detailed block diagram of the example communication node 100 for communicating data in the communication network 142 in accordance with an embodiment. The communication node 100 shown in FIG. 4 has a host controller interface bus (HCI) 402 at an interface between the secure host platform and the communication platform 112. The HCI 402 may be a standard interface used to transmit and receive data between the platforms, APIs and inter-processor messages between the host processor 102 and the communication controller 116. This standard interface may be used to transmit and receive messages over the communication network 142 in the legacy mode where protocol keys are stored and accessible to the host processor 102 in plaintext and a mode when protocol keys are secured from the host processor 102 in the communication node 100 as described herein.

In some examples, the key provided for storage in the secure key store 122 on the communication platform 112 may be the protocol keys such as SK or IRK rather than a protocol access key to decipher an encrypted protocol key such as the ESK or EIRK based on a cryptographic technique. The secure key store 122 may store the protocol keys in the communication platform 112 in one or more key registers so that a deciphering process is not needed.

Figure 5:
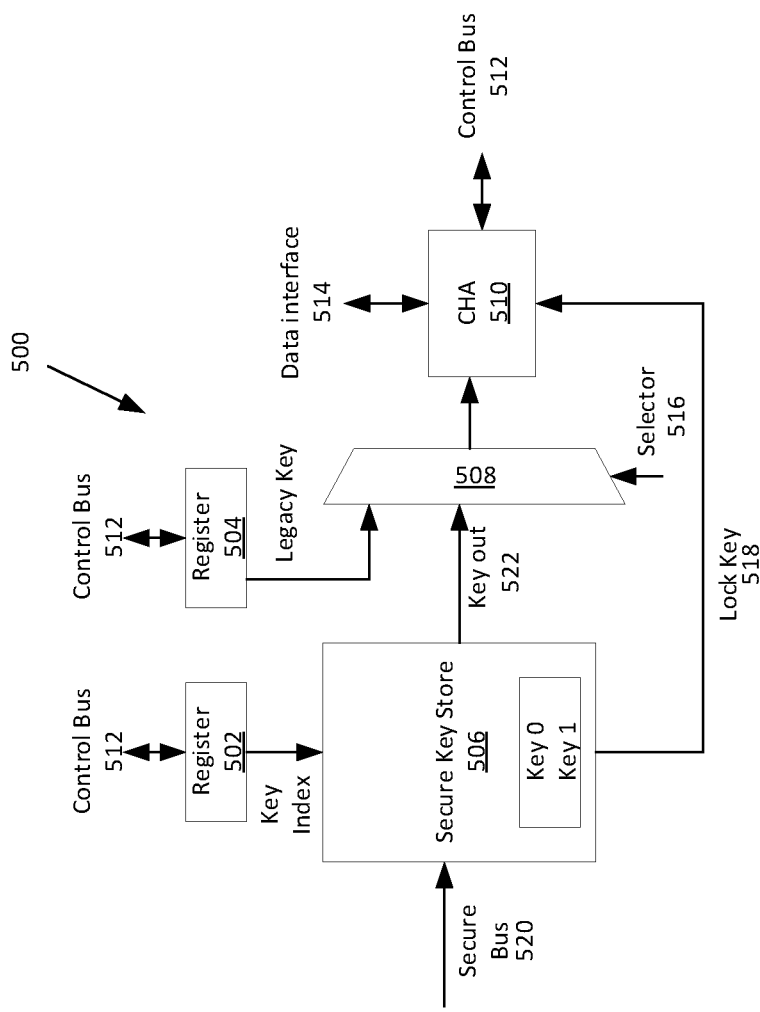
FIG. 5 is a block diagram of an example cryptographic engine of the communication node which includes a secure key store, selector, and cryptographic hardware accelerator (CHA) associated with securing cryptographic keys in the communication node in accordance with an embodiment.

FIG. 5 is a block diagram of an example cryptographic engine 500 which includes a secure key store 506, a selector 508, and cryptographic hardware accelerator (CHA) 510 associated with securing protocol keys in the communication node 100 in accordance with an embodiment. The cryptographic engine 500 may be a component of the communication platform 112 associated with secure communication in conjunction with one or more of the communication controller 116, secure key store 122, local memory 120, shared memory 114, and physical layer processor 118 and controlled by the communication controller 116. The components of the cryptographic engine 500 may be implemented using circuitry such as analog circuitry, mix signal circuitry, memory circuitry, logic circuitry, processing circuitry arranged to execute code stored in a memory and when executed by the processing circuitry perform the disclosed functions, or combinations thereof. In an example, the protocol key stored in one or more of the secure key store 506 and CHA 510 and transfer therebetween may not be accessible to the host processor 102 to maintain security of the protocol key.

The secure key store 122 may receive via the secure enclave 108 and a secure bus 128 a protocol key associated with a protocol such as Zigbee, IEEE 802.15.4, or Thread or Matter (using IEEE 802.15.4) rather than a protocol access key which would be used to decrypt an encrypted protocol key described in earlier embodiments. The protocol key stored in the secure key store 122 may be 128 bits and plaintext in an example. Based on a signal from the communication controller 116 or host processor 102, a protocol key in the secure key store 122 may be transferred from the secure key store 122 to the CHA 510 to encrypt or decrypt a message based on a cryptographic technique. The signal may be a key index stored in a key index register 502 which identifies the protocol key in the secure key store 122 which is output. The protocol key from the secure key store 122 may be provided to a selector 508. In a legacy operation where the communication platform 112 may have protocol keys in unencrypted form and accessible to the host processor 102, a register 504 may store a protocol key in plaintext which is provided to the selector 508. The communication controller 116 may cause a selector signal 516 to be applied to the selector 508 to select the protocol key output by the secure key store 122 to be provided to the CHA 510 or the protocol key from the register 504 to be provided in a legacy mode. The CHA 510 may receive messages to encrypt or decrypt from upper layer processing via a data interface 514 and a signal over a control bus 512 such as an advanced high-performance bus (AHB) from the communication controller 116 and perform the cryptographic operation based on the received protocol key. In an example, the CHA 510 may store the received protocol key in a register which is used to encrypt or decrypt a plurality of messages. The secure key store 122 may further provide a lock key signal 518 to the CHA 510. When enabled, the lock key signal 518 prevents access by the host processor 102 or communication controller 116 to readback the protocol key stored in the register of the CHA 510 via the data bus 514 or control bus 512. When disabled, the lock key signal 518 allows access by the host processor 102 or communication controller 116 to readback the protocol key stored in the register of the CHA 510 via the data bus 514 or control bus 512.

FIG. 6 is an example table 600 which summarizes operation of the communication node 100, 200 for different types of cryptographic keys in accordance with an embodiment. The table 600 describes operations of the communication node 100, 200 for SCPKs and ECPKS as examples.

For SCPKs, the host processor 102 may be a source of the encrypted protocol key which is transferred to the communication platform 112 in an example. The transfer may include different mechanisms including an unsecured bus 112 such as unsecured data bus or unsecured IPC bus via the serial bus 202 to deliver the encrypted protocol key to the shared memory 114 of the communication platform 112. Similarly, the secure enclave 108 may be a source of the protocol access key which is transferred to the communication platform 112. The transfer may include different mechanisms including a secured bus 128 or secure transfer over an unsecured bus such as the serial bus 202. The secure key store 122 may directly receive the protocol access key or the communication controller 116 may receive the protocol access key and provide the protocol access key to the secure key store 122. The host processor 102 and the communication controller 116 may have access to the encrypted protocol key. The host processor 102 may not have access to the protocol access key but the communication controller 116 may have access to the protocol access key if transferred to the secure key store 122 via the communication controller 116. The SCPKs may be deciphered by the CHA 124 but not stored on the communication platform 112 resulting in the SCPKs in plaintext not being accessible to the host processor 102 and communication controller 116.

For ECPKs, the host processor 102 may be a source of the encrypted protocol key which is transferred to the communication platform 112 in an example. The transfer may include different mechanisms including an unsecured bus 112 such as unsecured data bus or unsecured IPC bus via the serial bus 202 to deliver the encrypted protocol key to the shared memory 114 of the communication platform 112. Similarly, the secure enclave 108 may be a source of the protocol access key which is transferred to the communication platform 112. The transfer may include different mechanisms including a secured bus 128 or secure transfer over an unsecured IPC bus via the serial bus 202. The secure key store 122 may directly receive the protocol access key or the communication controller 116 may receive the protocol access key and provide the protocol access key to the secure key store 122. The host processor 102 may not have access to the protocol access key but the communication controller 116 may have access to the protocol access key if transferred to the secure key store via the communication controller 116. The ECPKs may be deciphered by the CHA and stored on in the local memory 120 resulting in the ECPKs in plaintext not being accessible to the host processor 102 but accessible to the communication controller 116.

Example Operation

Figure 7:
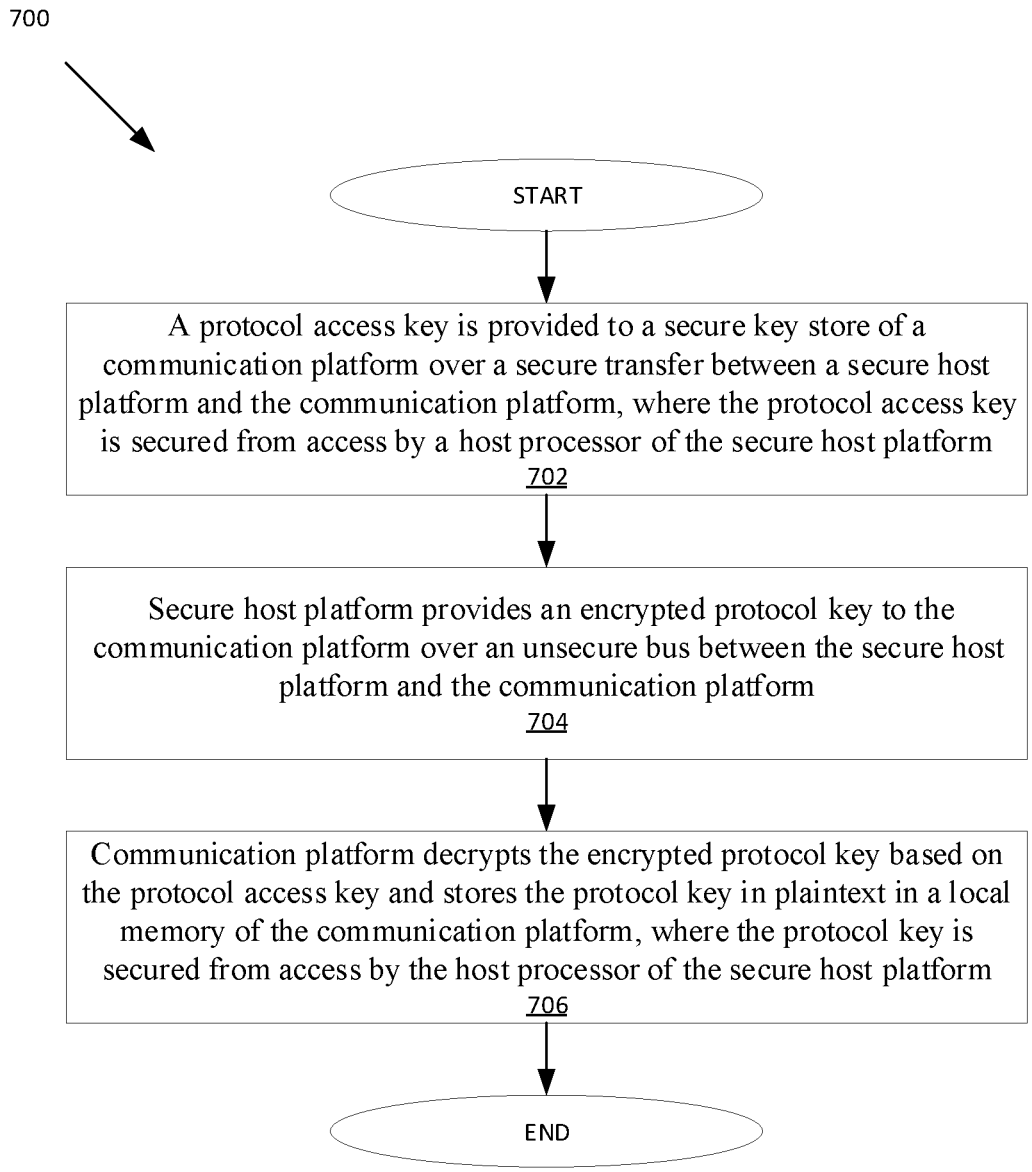
FIG. 7 is a flow chart of example functions associated with securing the cryptographic keys in accordance with an embodiment.

FIG. 7 is a flow chart of example functions 700 associated with securing protocol keys such as ECPKs in accordance with an embodiment. At 702, a protocol access key is provided to a secure key store 122 of a communication platform 112 over a secure transfer between the secure host platform 136 and the communication platform 112, where the protocol access key is secured from access by a host processor of the secure host platform 136. In an example, the communication controller 116 may cause the secure enclave 108 to provide the protocol access key. At 704, the host platform provides an encrypted protocol key to the communication platform 112 over an unsecure bus between the secure host platform 136 and the communication platform 112. In an example, the communication controller 116 may cause the secure enclave 108 to provide the encrypted protocol key to the host processor 102 which in turn provides the encrypted protocol key to the communication platform 112. Alternatively, the communication controller 116 may cause the secure enclave 108 to provide the encrypted protocol key directly to the communication platform 112. At 706, the communication platform 112 decrypts the encrypted protocol key based on the protocol access key and stores the protocol key in plaintext in a local memory of the communication platform, where the protocol key is secured from access by the host processor 102 of the secure host platform 136. In some examples, the encrypted protocol key may be stored in the shared memory 114 accessible to the host processor 102 directly, but the protocol key in plaintext is not accessible to the host processor 102.

Figure 8:
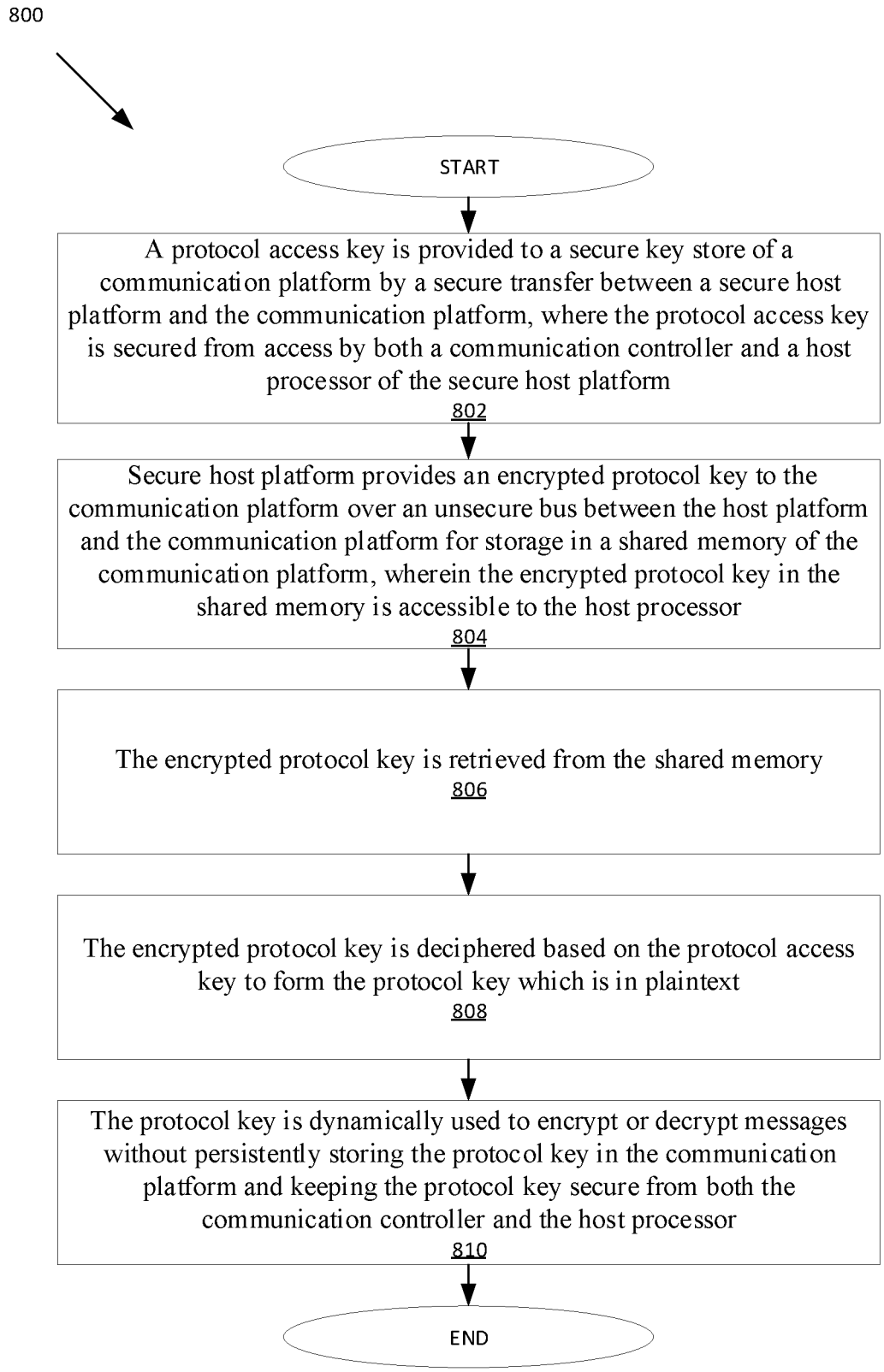
FIG. 8 is another flow chart of example functions associated with securing the cryptographic keys in accordance with an embodiment.

FIG. 8 is a flow chart of example functions 800 associated with securing protocol keys such as SCPKs in accordance with an embodiment. At 802, a protocol access key is provided to a secure key store 122 of a communication platform 112 by a secure transfer between the secure host platform 136 and the communication platform 112, where the protocol access key is secured from access by a host processor of the secure host platform. In a further example, the protocol access key may be secure from access by the communication controller 116. In an example, the communication controller 116 may cause the secure enclave 108 to provide the protocol access key. At 804, the secure host platform 136 provides an encrypted protocol key to the communication platform 112 over an unsecure bus between the secure host platform 136 and the communication platform 112 for storage in a shared memory of the communication platform, where the encrypted protocol key in the shared memory is accessible to the host processor. In an example, the communication controller 116 may cause the secure enclave 108 to provide the encrypted protocol key to the host processor 102 which in turn provides the protocol key to the shared memory 114 of the communication platform 112. Alternatively, the communication controller 116 may cause the secure enclave 108 to provide the encrypted protocol key directly to shared memory 114 of the communication platform 112. At 806, the encrypted protocol key is retrieved from the shared memory. At 808, the encrypted protocol key is deciphered based on the protocol access key to form the protocol key which is in plaintext. At 810, the protocol key is dynamically used to encrypt or decrypt messages without storing the protocol key in the communication platform 112 such as in a memory or register of the communication platform 112 (either persistently or non-transitorily). In an example, the CHA 124 may use the protocol key to encrypt or decrypt messages to be transmitted or received over the communication network 142. In examples, the protocol key in plaintext is secured from access by the host processor 102 of the secure host platform 136 and the communication controller 116.

In one embodiment, a method for securing protocol keys in a communication node is disclosed. The method comprises: transferring a protocol access key stored in a secure enclave of a secure host platform comprising a host processor to a secure key store in a communication platform via a secure transfer, wherein the protocol access key is secure from access by the host processor; encrypting a protocol key stored in the secure enclave to an encrypted protocol key; transferring the encrypted protocol key from the secure enclave to the communication platform over an unsecure bus; and deciphering the encrypted protocol key based on the protocol access key in the communication platform to recover the protocol key, wherein the protocol key which is plaintext is secure from access by the host processor. In the embodiment, the method further comprises storing the encrypted protocol key in a shared memory which is shared between the host processor and a communication controller of the communication platform. In the embodiment, deciphering the encrypted protocol key comprises retrieving the encrypted protocol key from the shared memory and retrieving the protocol access key from the secure key store and deciphering the encrypted protocol key based on the protocol access key, wherein the protocol key is not stored on the communication platform and not accessible to a communication controller of the communication platform. In the embodiment, the method further comprises storing the protocol key in a local memory of the communication platform which is not accessible to the host processor. In the embodiment, a bus in the secure host platform which is coupled to the host processor disables transfer of the protocol key in the local memory to the host processor. In an embodiment, the protocol access key is not secure from access by a communication controller of the communication platform. In the embodiment, the method further comprises deleting the protocol access key stored in the secure key store. In an embodiment, the protocol access key is ephemeral, the method further comprising refreshing the protocol access key stored in the secure key store.

In another embodiment, a communication node is disclosed. The communication node comprises: a secure host platform comprising a host processor and a secure enclave; a communication platform comprising a controller and a secure key store; the secure platform configured to transfer a protocol access key stored in the secure enclave to the secure key store via a secure transfer and encrypt a protocol key stored in the secure enclave to an encrypted protocol key, wherein the protocol access key and the protocol key which is plaintext are secure from access by the host processor; the host processor configured to transfer the encrypted protocol key to the communication platform over an unsecure bus; and the communication platform configured to decipher the encrypted protocol key based on the protocol access key in the communication platform to recover the protocol key. In the embodiment, the communication platform further comprises a shared memory which is shared between the host processor and communication platform for storing the encrypted protocol key. In the embodiment, the communication platform is further configured to retrieve the encrypted protocol key from the shared memory and retrieve the protocol access key from the secure key store and decipher the encrypted protocol key based on the protocol access key, wherein the protocol key is not stored on the communication platform and not accessible to the controller of the communication platform. In the embodiment, the communication platform further comprises a local memory to store the protocol key which is not accessible to the host processor. In the embodiment, a bus in the secure host platform which is coupled to the host processor disables transfer of the protocol key in the local memory to the host processor. In the embodiment, the protocol key is one of a session key (SK) and an identity resolving key (IRK) of the Bluetooth standard. In an embodiment, the unsecure bus is a serial bus between the secure host platform and the communication platform. In the embodiment, the secure enclave is configured to delete the protocol access key stored in the secure key store. In the embodiment, the protocol access key is ephemeral, wherein the secure enclave is configured to refresh the protocol access key stored in the secure key store.

In yet another embodiment, a method for securing protocol keys in a communication node is disclosed. The method comprises: transferring a protocol key stored in a secure enclave of a secure host platform comprising a host processor to a secure key store in a communication platform via a secure bus based on an key index to the protocol key which identifies the protocol key; transferring the protocol key from the secure key store to a cryptographic hardware accelerator (CHA) for storage in a register of the CHA; providing an indication to prevent access to the protocol key in the CHA by the host processor; and performing by the CHA encryption of a message provided by a communication controller or decryption of a message provided by a physical layer processor based on the protocol key; wherein the protocol key which is in plaintext is secure from access by the host processor and the communication controller. In the embodiment, the method further comprises selecting whether to transfer the protocol key or a legacy protocol key not secure from access by the host processor; and transferring the protocol key to the CHA based on selecting the transfer of the protocol key. In the embodiment, the method further comprises deleting or refreshing the protocol key stored in the secure key store.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method for securing protocol keys in a communication node comprising:
   transferring a protocol access key stored in a secure enclave of a secure host platform comprising a host processor to a secure key store in a communication platform via a secure bus arranged between the secure enclave and the secure key store,
   wherein the protocol access key is secure from access by the host processor and wherein the secure key store is coupled to a cryptographic hardware accelerator (CHA) in the communication platform;
   encrypting a protocol key stored in the secure enclave to an encrypted protocol key;
   transferring the encrypted protocol key from the secure enclave to the communication platform over an unsecure bus arranged between a data bus of the secure host platform and the communication platform;
   initiating, by a communication controller of the communication platform, decipher of the encrypted protocol key;
   receiving, by a decipher block of the communication platform, the protocol access key from the secure key store and the encrypted protocol key in response to the communication controller initiating the decipher of the encrypted protocol key; and
   deciphering, by the decipher block, the encrypted protocol key based on the protocol access key in the communication platform to recover the protocol key which is provided to the CHA, wherein the protocol key which is plaintext is secure from access by the host processor.

2. The method of claim 1, further comprising storing the encrypted protocol key in a shared memory which is shared between the host processor and the communication controller of the communication platform.

3. The method of claim 1, wherein deciphering the encrypted protocol key comprises retrieving the encrypted protocol key from a shared memory and retrieving the protocol access key from the secure key store and deciphering the encrypted protocol key based on the protocol access key, wherein the protocol key is not stored on the communication platform and not accessible to the communication controller of the communication platform.

4. The method of claim 1, further comprising storing the protocol key in a local memory of the communication platform which is not accessible to the host processor.

5. The method of claim 4, wherein a bus in the secure host platform which is coupled to the host processor disables transfer of the protocol key stored in the local memory to the host processor.

6. The method of claim 1, wherein the protocol access key is not secure from access by the communication controller of the communication platform.

7. The method of claim 1, further comprising deleting the protocol access key stored in the secure key store.

8. The method of claim 1, wherein the protocol access key is ephemeral, the method further comprising refreshing the protocol access key stored in the secure key store.

9. The method of claim 1, wherein the unsecure bus does not further obfuscate the transferred encrypted protocol key and the secure bus obfuscates the transferred protocol access key.

10. A communication node comprising:
    a secure host platform comprising a host processor and a secure enclave;
    a communication platform comprising a communication controller and a secure key store;
    the secure host platform configured to transfer a protocol access key stored in the secure enclave to the secure key store in a communication platform via a secure bus arranged between the secure enclave and the secure key store
    and encrypt a protocol key stored in the secure enclave to an encrypted protocol key,
    wherein the protocol access key and the protocol key which is plaintext are secure from access by the host processor and
    wherein the secure key store is coupled to a cryptographic hardware accelerator (CHA) in the communication platform;
    the host processor configured to transfer the encrypted protocol key to the communication platform over an unsecure bus arranged between a data bus of the secure host platform and the communication platform;
    the communication controller of the communication platform configured to initiate decipher of the encrypted protocol key;
    a decipher block of the communication platform configured to receive the protocol access key from the secure key store and the encrypted protocol key in response to the communication controller initiating the decipher of the encrypted protocol key; and
    the decipher block of the communication platform configured to decipher the encrypted protocol key based on the protocol access key in the communication platform to recover the protocol key which is provided to the CHA.

11. The communication node of claim 10, wherein the communication platform further comprises a shared memory which is shared between the host processor and communication platform for storing the encrypted protocol key.

12. The communication node of claim 11, wherein the communication platform is further configured to retrieve the encrypted protocol key from the shared memory and retrieve the protocol access key from the secure key store and decipher the encrypted protocol key based on the protocol access key, wherein the protocol key is not stored on the communication platform and not accessible to the communication controller of the communication platform.

13. The communication node of claim 10, wherein the communication platform further comprises a local memory to store the protocol key which is not accessible to the host processor.

14. The communication node of claim 13, wherein a bus in the secure host platform which is coupled to the host processor disables transfer of the protocol key in the local memory to the host processor.

15. The communication node of claim 10, wherein the protocol key is one of a session key (SK) and an identity resolving key (IRK) of the Bluetooth standard.

16. The communication node of claim 10, wherein the unsecure bus is a serial bus between the secure host platform and the communication platform.

17. The communication node of claim 10, wherein the secure enclave is configured to delete the protocol access key stored in the secure key store.

18. The communication node of claim 10, wherein the protocol access key is ephemeral, wherein the secure enclave is configured to refresh the protocol access key stored in the secure key store.

19. The communication node of claim 10, wherein the unsecure bus does not further obfuscate the transferred encrypted protocol key and the secure bus obfuscates the transferred protocol access key.

20. A method for securing protocol keys in a communication node comprising:
 transferring a protocol key stored in a secure enclave of a secure host platform comprising a host processor to a secure key store in a communication platform via a secure bus based on a key index to the protocol key which identifies the protocol key;
 transferring the protocol key from the secure key store to a cryptographic hardware accelerator (CHA) for storage in a register of the CHA;
 providing an indication to the CHA to always prevent access to the protocol key stored in the CHA by the host processor when the protocol key is transferred to the CHA,
 wherein the indication is a lock key signal output by the secure key store; and
 performing by the CHA encryption of a message provided by a communication controller or decryption of a message provided by a physical layer processor based on the protocol key;
 wherein the protocol key which is in plaintext is secure from access by the host processor and the communication controller.

21. The method of claim 20, further comprising selecting whether to transfer the protocol key or a legacy protocol key not secure from access by the host processor; and transferring the protocol key to the CHA based on selecting the transfer of the protocol key.

22. The method of claim 20, further comprising deleting or refreshing the protocol key stored in the secure key store.

\* \* \* \* \*